(12) United States Patent
Rayssiguier

(10) Patent No.: US 9,650,843 B2
(45) Date of Patent: May 16, 2017

(54) JUNCTION BOX TO SECURE AND ELECTRONICALLY CONNECT DOWNHOLE TOOLS

(75) Inventor: Christophe M Rayssiguier, Melun (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 645 days.

(21) Appl. No.: 13/483,060

(22) Filed: May 30, 2012

(65) Prior Publication Data

US 2012/0312528 A1 Dec. 13, 2012

Related U.S. Application Data

(60) Provisional application No. 61/491,423, filed on May 31, 2011.

(51) Int. Cl.
*E21B 17/00* (2006.01)
*E21B 17/02* (2006.01)

(52) U.S. Cl.
CPC .......... *E21B 17/028* (2013.01); *E21B 17/026* (2013.01)

(58) Field of Classification Search
USPC .................................................. 439/76.2, 949
See application file for complete search history.

(56) References Cited

U.S. PATENT DOCUMENTS 3,164,207 A * 1/1965 Thessen .............. E21B 43/2403
166/247
4,593,771 A 6/1986 Comeau
4,628,995 A 12/1986 Young
5,211,570 A * 5/1993 Bitney ................. H01R 13/748
439/320
5,303,773 A 4/1994 Czernichow et al.
5,329,811 A * 7/1994 Schultz et al. ............. 73/152.02
5,344,377 A 9/1994 Meeks
(Continued)

FOREIGN PATENT DOCUMENTS

WO 99/36924 7/1999

OTHER PUBLICATIONS

International Search Report for the equivalent PCT patent application No. PCT/IB2012/052737 issued on Sep. 10, 2013.
(Continued)

*Primary Examiner* — Taras P Bemko
(74) *Attorney, Agent, or Firm* — Cameron R. Sneddon

(57) ABSTRACT

A junction box is disclosed. The junction box is made of a body member defining a first port and a second port, the first port adapted to receive a first portion of a first downhole tool, and the second port adapted to receive a second portion of a second downhole tool, the body member defining an electric chamber intersecting the first port and the second port within the body member; a first mechanical connection on the first port for securing the first downhole tool; a second mechanical connection on the second port for securing the second downhole tool; a first electric connector installed on the first port; a second electric connector installed on the second port; and electric wiring positioned within the electric chamber and connected to the first electric connector and the second electric connector to couple the first electric connector and the second electric connector.

11 Claims, 16 Drawing Sheets

(56) References Cited

U.S. PATENT DOCUMENTS

| | | | |
|---|---|---|---|
| 5,493,626 | A | 2/1996 | Schultz et al. |
| 5,501,285 | A | 3/1996 | Lamine et al. |
| 5,667,009 | A | 9/1997 | Moore |
| 6,499,541 | B1 | 12/2002 | Hiron et al. |
| 6,957,704 | B2 | 10/2005 | Rogers et al. |
| 7,339,494 | B2 | 3/2008 | Shah et al. |
| 7,595,737 | B2 | 9/2009 | Fink et al. |
| 2003/0068907 | A1 | 4/2003 | Morte et al. |
| 2003/0226662 | A1* | 12/2003 | Linyaev et al. ......... 166/250.11 |
| 2006/0211305 | A1* | 9/2006 | Scott ............................ 439/607 |
| 2010/0112831 | A1* | 5/2010 | Asada ........................ 439/76.2 |

OTHER PUBLICATIONS

International Preliminary Report on patentability issued in the related PCT application PCT/IB2012/052737, dated Dec. 2, 2013 (7 pages).

\* cited by examiner

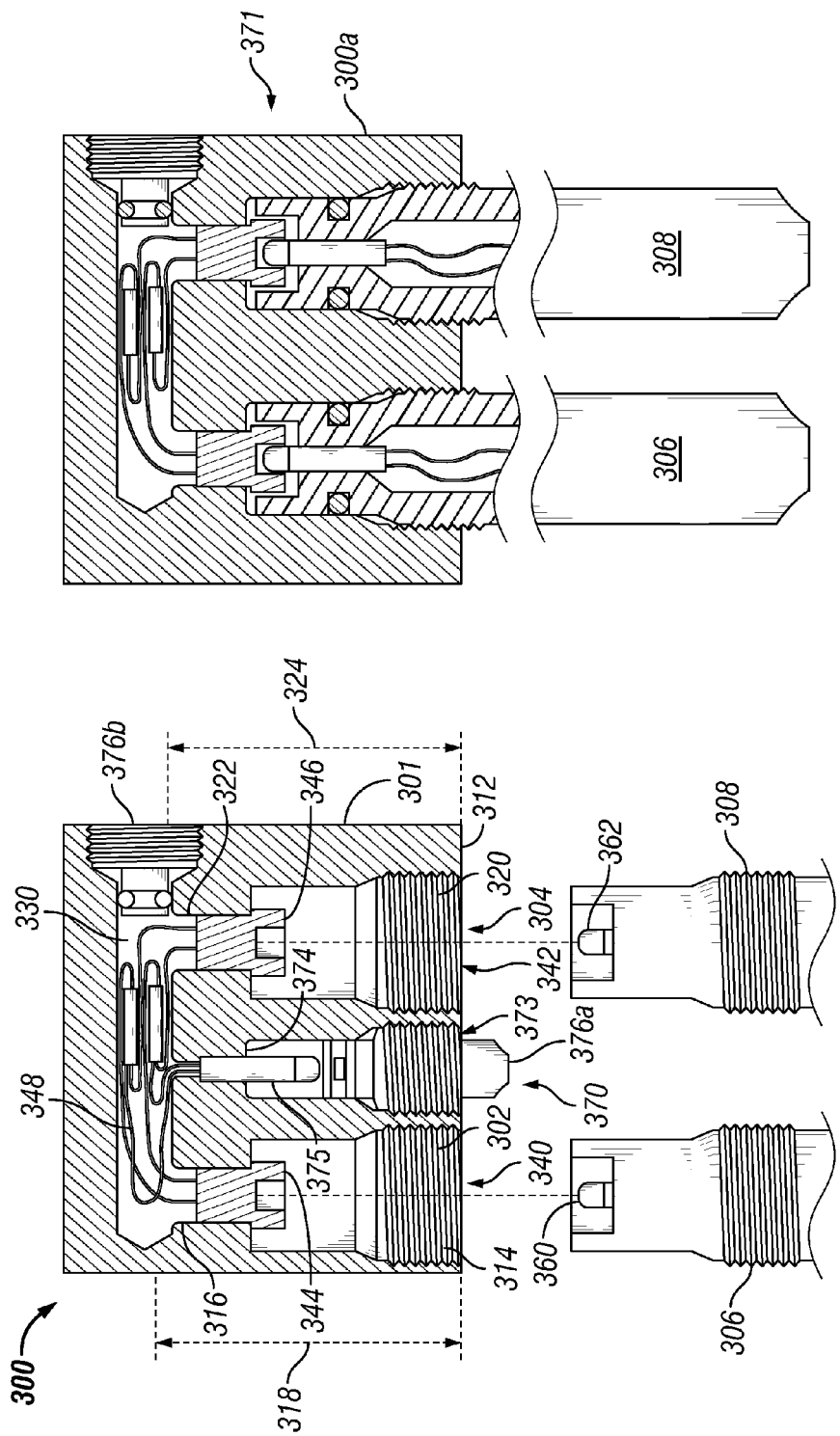

JUNCTION BOX TO SECURE AND ELECTRONICALLY CONNECT DOWNHOLE TOOLS

CROSS-REFERENCE TO RELATED APPLICATIONS

Under 35 U.S.C. §119(e), the present application is based on and claims priority to U.S. Provisional Application No. 61/491,423, filed May 31, 2011, the entire contents of which is expressly incorporated herein by reference.

TECHNICAL FIELD

This disclosure relates generally to a junction box for use in oil and gas wells or the like. The junction box mechanically secures at least two downhole tools together, as well as establishes an electrical connection between the at least two downhole tools. More particularly, but not by way of limitation, the present disclosure relates to a junction box that can be integral or separate from a clamp assembly for attaching and electrically connecting, through a sealed atmospheric chamber, downhole tools such as an acoustic modem which transmits and receives data and control signals between a location down a borehole and the surface, or between downhole locations themselves.

BACKGROUND ART

One of the more difficult problems associated with any borehole is to communicate measured data between one or more locations down a borehole and the surface, or between downhole locations themselves. For example, in the oil and gas industry it is desirable to communicate data generated downhole to the surface during operations such as drilling, perforating, fracturing, and drill stem or well testing; and during production operations such as reservoir evaluation testing, pressure and temperature monitoring. Communication is also desired to transmit intelligence from the surface to downhole tools or instruments to effect, control or modify operations or parameters.

Accurate and reliable downhole communication is particularly important when complex data comprising a set of measurements or instructions is to be communicated, i.e., when more than a single measurement or a simple trigger signal has to be communicated. For the transmission of complex data it is often desirable to communicate encoded analog or digital signals. These transmissions can be performed through direct wire connection between the surface and the downhole location(s) or through wireless communications techniques such as electromagnetic waves, pressure or fluid pulses, and acoustic communication.

A tubing is composed of many pipes linked together by connections. There are few nominal sizes for the outside diameter (for example 2⅞ inches, 3.5 inches or 4.5 inches). The outside diameter has a rather large tolerance which is defined by norms edited by the American Petroleum Institute. The connection between pipes, which may be called a "coupling", comprises a thread, and a very large variety of connections exist on the present market. Most of the time, the coupling outside diameters are larger than a diameter of the pipe.

When a device, such as a sensor (temperature, pressure) or a transmitter (for example acoustic transmitter) must be secured on the pipe, such device can either be installed in a carrier (also called a mandrel) placed between two pieces of pipe (see for example, U.S. Pat. No. 7,339,494) or it can be clamped directly along the outside diameter of the pipe, using one or several mechanical collars called "clamps". Usually, the prior art clamps are made of at least two parts which are secured together so that they can be directly installed on the tubing, without engaging the connections.

However, a tool secured outside of the tubing can be exposed to large axial loads and shock when the pipe is moving inside an open hole (whose rugged surface can generate a high friction force when dragging), or when the tool engages a liner. The liner, for example, may be a casing of smaller size located in a lower part of a well. Therefore, the liner forms an abrupt change in diameter with the upper casing. When the tool is an acoustic modem, such acoustic modem has a transceiver assembly which vibrates to introduce axial stress waves into the tubing. In this instance, the acoustic modem should be securely connected to the tubing to maximize the signal transferred from the acoustic modem into the tubing.

As discussed above, clamps are often used for attaching downhole communications tools and/or wires to a downhole pipe. Clamps are well known in the art and take the form of hinged friction collars, hinged collars with set screws, and hinged collars with dogs. See for example, U.S. Pat. No. 6,957,704.

Other means for attaching downhole tools to a section of pipe include drill stem testing (DST) gauge carriers. These DST gauge carriers (DGA) are used to secure downhole pressure and temperature measuring gauges to sections of pipe to measure temperature and pressure conditions within the well bore. A DGA can be attached to a packer, as disclosed in U.S. Pat. No. 4,628,995, along with a packer through the tubing. As disclosed in U.S. Pat. No. 4,593,771, a DGA can be integrated into a section of pipe using either a single location of attachment for a downhole pressure and temperature gauge or multiple attachment points for securing multiple downhole pressure and temperature gauges without interconnecting the multiple gauges to each other. An advantage to mounting the pressure and temperature gauges to the exterior of a section of pipe through a clamp mechanism or with the DGA integrated into the exterior of the section of pipe is that pressure and temperature measurements can be obtained without substantial pressure drop across the measuring sub or preventing flow through the section of pipe.

When a device, such as a sensor (temperature, pressure) or a transmitter (for example acoustic transmitter) must be secured on the pipe, such device usually requires electric wires to be connected to the tool so that it can transmit or receive information to or from the surface or to or from another tool. The traditional way, widely used in the oil and gas industry is to link the devices by electric wires protected by rubber boots, as in U.S. Pat. Nos. 5,344,377, 5,493,626, and 5,667,009. The boots ensure an electrical insulation against the downhole fluid under high pressure and can protect the electric connectors during the installation process. The electric contact to link the wire to the internal components of the device must create the pressure barrier. This component, a feed-through connector, is usually quite expensive. Further, boot assemblies can be unreliable for long term use in the downhole environment, because of the difficulty in ensuring perfect sealing between the rubber boot and the plastic insulation on the wires. In addition, the rubber can be slightly permeable, allowing gas and oil to slowly migrate inside the rubber. This migration reduces the dielectric properties of the rubber. When moisture is allowed to penetrate inside the boot, the moisture decreases the insulation and jeopardizes the reliability of the system.

Despite the efforts of the prior art, there exists a need for an electrical connection, such as a junction box, to create a more reliable seal around electrical connections of downhole tools. In addition, there is a need to connect multiple downhole tools through a junction box which maintains a reliable seal around the electrical connections. It is therefore desirable to provide an improved junction box or electrical connection seal assembly with better sealing capabilities for downhole tools. It is to such a junction box that the present disclosure is directed.

BRIEF DISCLOSURE OF THE INVENTION

In a first aspect, a junction box for connecting at least two downhole tools to a section of tubing is disclosed. The junction box comprises a body member defining a first port and a second port, the first port adapted to receive a first portion of a first downhole tool, and the second port adapted to receive a second portion of a second downhole tool, the body member having one or more external surfaces, the first port and the second port having a first end intersecting the one or more external surfaces, a second end positioned within the body member, and first and second lengths extending between the first end and the second end, the first and second lengths being less than lengths of the first downhole tool and the second downhole tool, the body member defining an electric chamber intersecting the first port and the second port within the body member; a first mechanical connection on the first port for securing the first downhole tool; a second mechanical connection on the second port for securing the second downhole tool; a first electric connector installed on the second end of the first port; a second electric connector installed on the second end of the second port; and electric wiring positioned within the electric chamber and connected to the first electric connector and the second electric connector to couple the first electric connector and the second electric connector.

In one embodiment, the body member is integral with a first clamp part of a clamp assembly. In a second embodiment, the body member is separate from a first clamp part of a clamp assembly and adapted to connect to the first clamp part.

In an alternative embodiment, the junction box further comprises a first plug, and wherein the body member further defines a read-out port having a first end intersecting the one or more external surfaces and a second end intersecting the electric chamber; a third electric connector installed on the second end of the read-out port, the third electric connector coupled to the electric wiring; and a third mechanical connection on the read-out port for securing the first plug.

In a further embodiment, the body member is configured for connection to a drill stem testing gauge assembly.

According to a second aspect, a clamp assembly for connecting at least two downhole tools to a section of tubing is disclosed. The clamp assembly comprising: a first clamp part having a first end and a second end, the first end having at least two connections defining ports for receiving and securing the downhole tools, the first clamp part having a first side and a second side extending between the first end and the second end, the first clamp part having a first inner clamp surface extending between the first side and the second side, and a first external surface extending between the first side and the second side, the first clamp part defining an electric chamber extending between the ports; a second clamp part having a third end, a fourth end, a third side, and a fourth side with the third side and the fourth side extending between the third end and the fourth end, the second clamp part also having a second inner clamp surface extending between the third side and the fourth side, and a second external surface extending between the third side and the fourth side; a hinge assembly connecting the first side to the third side and configured to permit the first clamp part and the second clamp part to be moved to a closed position where the second side is positioned adjacent to the fourth side and an open position where the second side and the fourth side are spaced a distance apart to receive the tubing; a fastener connecting the second side to the fourth side when the first clamp part and the second clamp part are in the closed position; and wherein, the first inner clamp surface and the second inner clamp surface are sized and dimensioned to grip the exterior surface of the tubing when the first clamp part and the second clamp part are in the closed position.

In one embodiment, the one of the ports is a read-out port. In a further embodiment, the at least two ports include seals for sealing the downhole tool within the mechanical connection. In an alternative embodiment, the seals are o-rings.

In an alternative embodiments, one of the ports is a first port, and the other one of the ports is a second port, and wherein the clamp assembly further comprises a first electric connector positioned within the first port; a second electric connector positioned within the second port; and electric wiring connecting the first electric connector to the second electric connector, the electric wiring extending through the electric chamber.

In a third aspect, an apparatus is disclosed. The apparatus comprises a first downhole tool; a second downhole tool; a carrier tool; and a junction box connected to the carrier tool, the junction box comprising: a body member defining a first port and a second port, the first port receiving a first portion of the first downhole tool, and the second port receiving a second portion of a second downhole tool, the body member having one or more external surfaces, the first port and the second port having a first end intersecting the one or more external surfaces, a second end positioned within the body member, and first and second lengths extending between the first end and the second end, the first and second lengths being less than lengths of the first downhole tool and the second downhole tool, the body member defining an electric chamber intersecting the first port and the second port within the body member; a first mechanical connection on the first port for securing the first downhole tool; a second mechanical connection on the second port for securing the second downhole tool; a first electric connector installed on the second end of the first port and communicating with the first downhole tool; a second electric connector installed on the second end of the second port and communicating with the second downhole tool; and electric wiring positioned within the electric chamber and connected to the first electric connector and the second electric connector to couple the first electric connector and the second electric connector.

In one embodiment, the body member is an internal to the carrier tool. In a second embodiment, the junction box is external to the carrier tool.

In an alternative embodiment, the junction box further comprising a first plug, and wherein the body member further defines a read-out port having a first end intersecting the one or more external surfaces and a second end intersecting the electric chamber; and wherein the junction box further comprises a third electric connector installed on the second end of the read-out port, the third electric connector coupled to the electric wiring; and a third mechanical connection on the read-out port for securing the first plug.

In an alternative embodiment the carrier tool includes a drill stem testing gauge assembly.

In a fourth aspect, a method of establishing communication between a first downhole tool and a second downhole tool is disclosed. The method comprises connecting the first downhole tool to a first port of a junction box; connecting the second downhole tool to a second port of the junction box, the junction box having a first electric connector in the first port, and a second electric connector in the second port, the first downhole tool having a third electric connector connected to the first electric connector, and the second downhole tool having a fourth electric connector connected to the second electric connector; and connecting the junction box to a carrier tool sized and adapted to be positioned within a well.

In a fifth aspect, a method is disclosed, comprising possessing two clamp assemblies with a first one of the clamp assemblies having first and second ports for receiving and securing the at least two downhole tools, the first one of the at least two clamp assemblies having (1) an electric chamber intersecting the first and second ports, (2) first and second electric connectors within the first and second ports, and (3) electrical wiring extending through the electric chamber and connecting the first and second electric connectors together; connecting two of the downhole tools to the at least two clamp assemblies with the electric connectors and the electric wiring of the first one of the at least two clamp assemblies establishing electrical communication between the two downhole tools; connecting the two clamp assemblies to an exterior surface of the tubing; and inserting the two clamp assemblies and the at least two downhole tools into a well

BRIEF DESCRIPTION OF THE DRAWINGS

Certain embodiments of the present invention will hereafter be described with reference to the accompanying drawings, wherein like reference numerals denote like elements, and:

FIG. 14 is a cross-sectional view of a junction box constructed in accordance with the present disclosure;

FIG. 15 is a perspective view of another embodiment of a junction box constructed in accordance with the present disclosure having a first downhole tool and a second downhole tool mechanically secured thereto;

DETAILED DESCRIPTION

Figure 1:
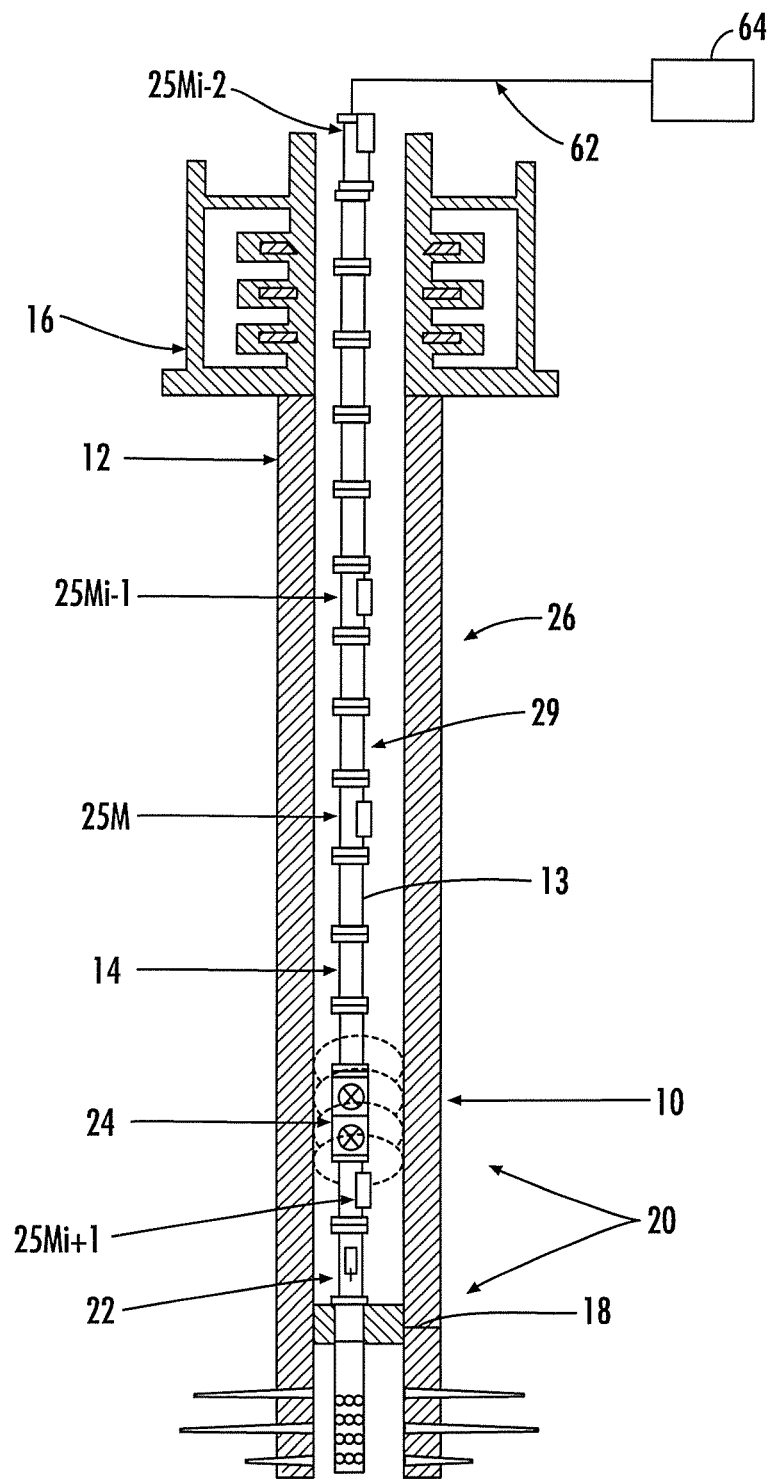
FIG. 1 shows a schematic view of an acoustic telemetry system according to an embodiment of the present invention.

The present invention is particularly applicable to testing installations such as are used in oil and gas wells or the like. FIG. 1 shows a schematic view of such a system. Once a well 10 has been drilled through a formation, the drill string can be used to perform tests, and determine various properties of the formation through which the well has been drilled. In the example of FIG. 1, the well 10 has been lined with a steel casing 12 (cased hole) in the conventional manner, although similar systems can be used in unlined (open hole) environments. In order to test the formations, it is preferable to place testing apparatus in the well close to the regions to be tested, to be able to isolate sections or intervals of the well, and to convey fluids from the regions of interest to the surface. This is commonly done using a jointed tubular drill pipe, drill string, production tubing, sections thereof, or the like (collectively, tubing 14) which extends from well-head equipment 16 at the surface down inside the well 10 to a zone of interest. The well-head equipment 16 can include blow-out preventers and connections for fluid, power and data communication.

A packer 18 is positioned on the tubing 14 and can be actuated to seal the borehole around the tubing 14 at the region of interest. Various pieces of downhole test equipment (collectively, downhole equipment 20) are connected to the tubing 14 above or below the packer 18. Such downhole equipment 20 may be referred to herein as one or more downhole tool and may include, but is not limited to: additional packers; tester valves; circulation valves; downhole chokes; firing heads; TCP (tubing conveyed perforator) gun drop subs; samplers; pressure gauges; downhole flow meters; downhole fluid analyzers; and the like.

In the embodiment of FIG. 1, a sampler 22 is located above the packer 18 and a tester valve 24 is located above the packer 18. The downhole equipment 20 may be connected to an acoustic modem 25Mi+1 which can be mounted using at least two clamp assemblies 28a and 28b (see FIG. 3) positioned between the sampler 22 and the tester valve 24. The acoustic modem 25Mi+1, operates to allow electrical signals from the downhole equipment 20 to be converted into acoustic signals for transmission to the surface via the tubing 14, and to convert acoustic tool control signals from the surface into electrical signals for operating the downhole equipment 20. The term "data," as used herein, is meant to encompass control signals, tool status, and any variation thereof whether transmitted via digital or analog signals.

Figure 2:
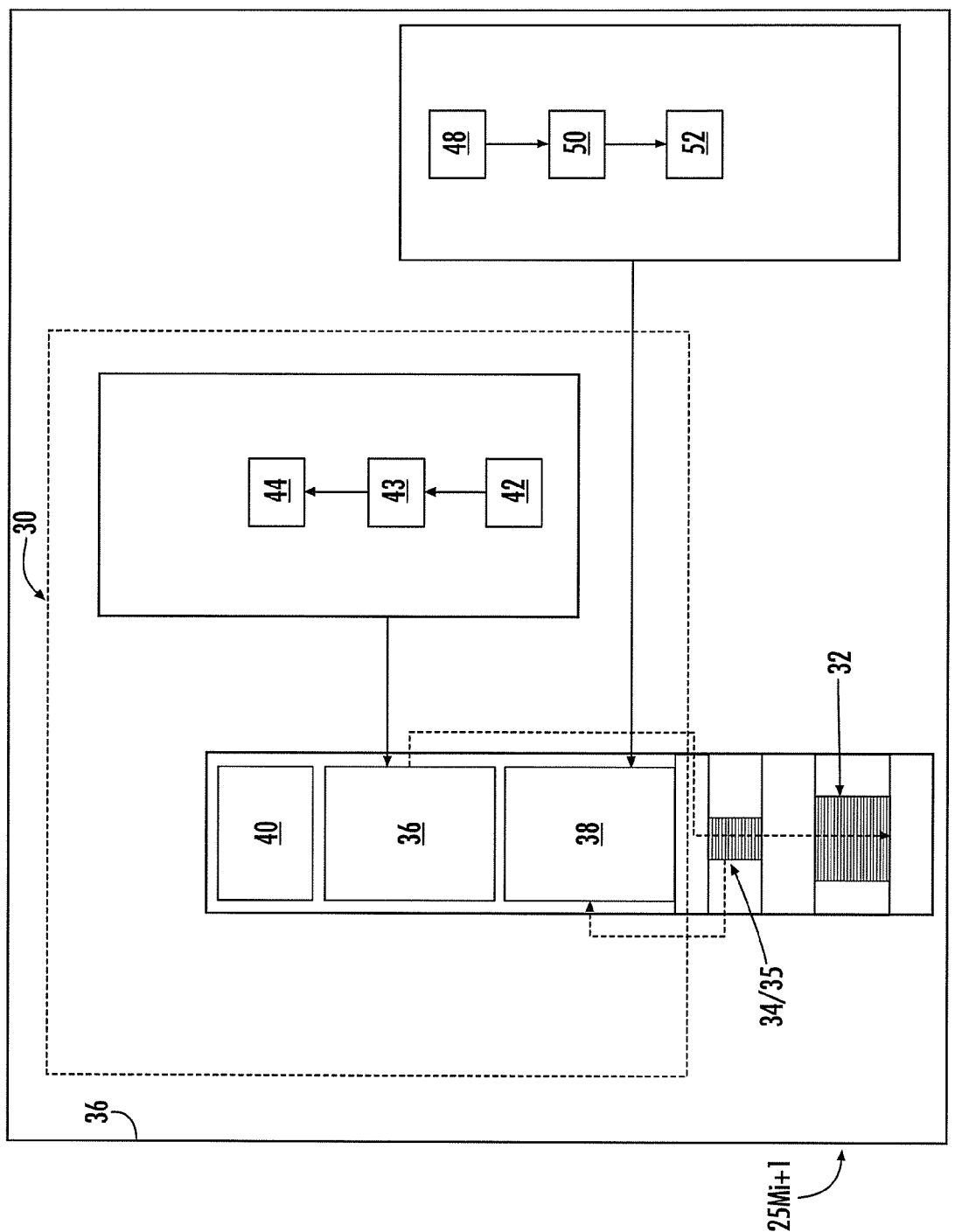
FIG. 2 shows a schematic of an acoustic modem as used in accordance with the embodiment of FIG. 1.

FIG. 2 shows a schematic of the acoustic modem 25Mi+1 in more detail. The acoustic modem 25Mi+1 comprises a housing 30 supporting a transceiver assembly 32 which can be a piezo electric actuator or stack, and/or a magnetorestrictive element which can be driven to create an acoustic signal in the tubing 14. The acoustic modem 25Mi+1 can also include an accelerometer 34 and/or an additional transceiver assembly 35 for receiving acoustic signals. Where the acoustic modem 25Mi+1 is only required to receive acoustic messages, the transceiver assembly 35 may be omitted. The acoustic modem 25Mi+1 also includes transmitter electronics 36 and receiver electronics 38 located in the housing 30 and power is provided by means of a battery, such as a lithium battery 40. Other types of power supply may also be used.

The transmitter electronics 36 are arranged to initially receive an electrical output signal from a sensor 42, for example from the downhole equipment 20 provided from an electrical or electro/mechanical interface. Such signals are typically digital signals which can be provided to a microcontroller 43 which modulates the signal in one of a number of known ways PSK, QPSK, QAM, and the like. The micro-controller 43 can be implemented as a single micro-controller or two or more micro-controllers working together. In any event, the resulting modulated signal is amplified by either a linear, or non-linear, amplifier 44 and transmitted to the transceiver assembly 32 so as to generate an acoustic signal (which is also referred to herein as an acoustic message) in the material of the tubing 14.

The acoustic signal passes along the tubing 14 as a longitudinal and/or flexural wave comprises a carrier signal with an applied modulation of the data received from the sensors 42. The acoustic signal typically has, but is not limited to, a frequency in the range 1-10 kHz, preferably in the range 2-5 kHz, and is configured to pass data at a rate of, but is not limited to, about 1 bps to about 200 bps, preferably from about 5 to about 100 bps, and more preferably about 50 bps. The data rate is dependent upon conditions such as the noise level, carrier frequency, Inter Symbol Interference and the distance between the acoustic modems 25Mi−2, 25Mi−1, 25M and 25Mi+1. A preferred embodiment of the present disclosure is directed to a combination of a short hop acoustic modems 25Mi−1, 25M and 25Mi+1 for transmitting data between the surface and the downhole equipment 20, which may be located above and/or below the packer 18. The acoustic modems 25Mi−1 and 25M can be configured as repeaters of the acoustic signals. The system may be designed to transmit data as high as 200 bps. Other advantages of the present system exist.

The receiver electronics 38 of the acoustic modem 25Mi+1 are arranged to receive the acoustic signal passing along the tubing 14 produced by the transmitter electronics 36 of the acoustic modem 25M. The receiver electronics 38 are capable of converting the acoustic signal into an electric signal. In a preferred embodiment, the acoustic signal passing along the tubing 14 excites the transceiver assembly 32 so as to generate an electric output signal (voltage); however, it is contemplated that the acoustic signal may excite the accelerometer 34 or the additional transceiver assembly 35 so as to generate an electric output signal (voltage). This signal is essentially an analog signal carrying digital information. The analog signal is applied to a signal conditioner 48, which operates to filter/condition the analog signal to be digitalized by an A/D (analog-to-digital) converter 50. The A/D converter 50 provides a digitalized signal which can be applied to a microcontroller 52. The microcontroller 52 is preferably adapted to demodulate the digital signal in order to recover the data provided by the sensor 42, or provided by the surface. The type of signal processing depends on the applied modulation (i.e. PSK, QPSK, OFDM, QAM, and the like).

The acoustic modem 25Mi+1 can therefore operate to transmit acoustic data signals from sensors 42 in the downhole equipment 20 along the tubing 14. In this case, the electrical signals from the downhole equipment 20 are applied to the transmitter electronics 36 (described above) which operate to generate the acoustic signal. The acoustic modem 25Mi+1 can also operate to receive acoustic control signals to be applied to the downhole equipment 20. In this case, the acoustic signals are demodulated by the receiver electronics 38 (described above), which operate to generate the electric control signal that can be applied to the downhole equipment 20.

Returning to FIG. 1, in order to support acoustic signal transmission along the tubing 14 between the downhole location and the surface, a series of the acoustic modems 25Mi−1 and 25M, etc. may be positioned along the tubing 14. The acoustic modem 25M, for example, operates to receive an acoustic signal generated in the tubing 14 by the acoustic modem 25Mi−1 and to amplify and retransmit the signal for further propagation along the tubing 14. The number and spacing of the acoustic modems 25Mi−1 and 25M will depend on the particular installation selected, for example, or the distance that the signal must travel. A typical spacing between the acoustic modems 25Mi−1, 25M, and 25Mi+1 is around 1,000 ft, but may be much more or much less in order to accommodate all possible testing tool configurations. When acting as a repeater, the acoustic signal is received and processed by the receiver electronics 38 and the output signal is provided to the microcontroller 52 of the transmitter electronics 36 and used to drive the transceiver assembly 32 in the manner described above. Thus an acoustic signal can be passed between the surface and the downhole location in a series of short hops.

The role of a repeater is to detect an incoming signal, to decode it, to interpret it and to subsequently rebroadcast it if required. In some implementations, the repeater does not decode the signal but merely amplifies the signal (and the noise). In this case the repeater is acting as a simple signal booster. However, this is not the preferred implementation selected for wireless telemetry systems of the present invention.

The acoustic modems 25M, 25Mi−1, 25Mi−2, and 25Mi+2 will either listen continuously for any incoming signal or may listen from time to time.

The acoustic wireless signals, conveying commands or messages, propagate in the transmission medium (the tubing 14) in an omni-directional fashion, that is to say up and down. It is not necessary for the acoustic modem 25Mi+1 to know whether the acoustic signal is coming from the acoustic modem 25M above or an acoustic modem 25Mi+2 (not shown) below. The direction of the acoustic message is preferably embedded in the acoustic message itself. Each acoustic message contains several network addresses: the address of the acoustic modem 25Mi−1, 25M or 25Mi+1 originating the acoustic message and the address of the acoustic modem 25Mi−1, 25M or 25Mi+1 that is the destination. Based on the addresses embedded in the acoustic messages, the acoustic modem 25Mi−1 or 25M functioning as a repeater will interpret the acoustic message and construct a new message with updated information regarding the acoustic modem 25Mi−1, 25M or 25Mi+1 that originated the acoustic message and the destination addresses. Acoustic messages will be transmitted from acoustic modem 25Mi−1 to 25M and may be slightly modified to include new network addresses.

Referring again to FIG. 1, the acoustic modem 25Mi−2 is provided at surface, such as at or near the well-head equipment 16 which provides a connection between the tubing 14 and a data cable or wireless connection 62 to a control system 64 that can receive data from the downhole equipment 20 and provide control signals for its operation.

In the embodiment of FIG. 1, the acoustic telemetry system is used to provide communication between the surface and a section of the tubing 14 located downhole.

Clamp Assembly

Figure 3:
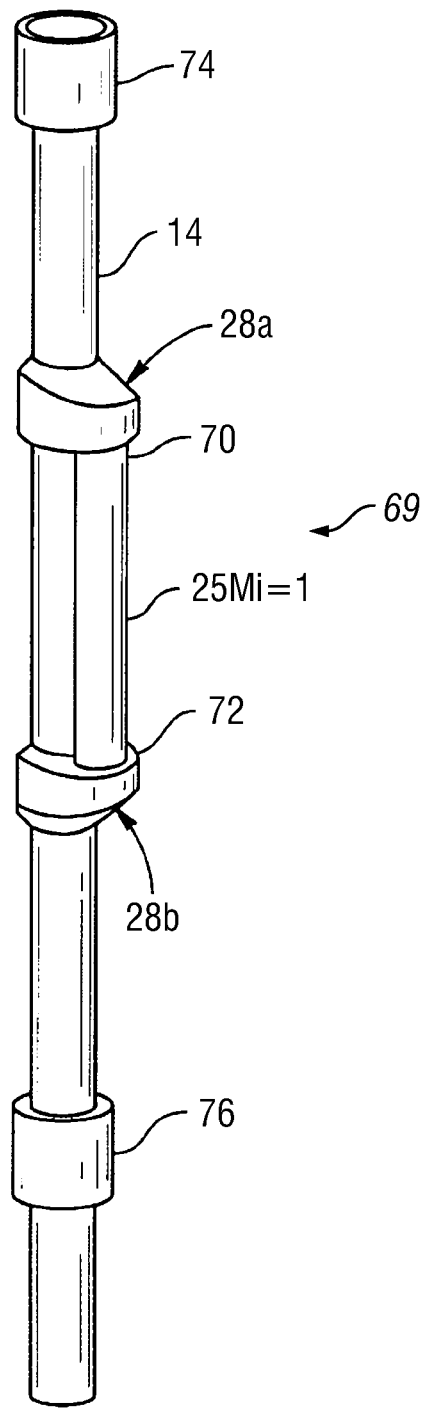
FIG. 3 is a perspective view of a section of a tubing having a tool connected to the tubing with two clamp assemblies constructed in accordance with the present disclosure.
Figure 13:
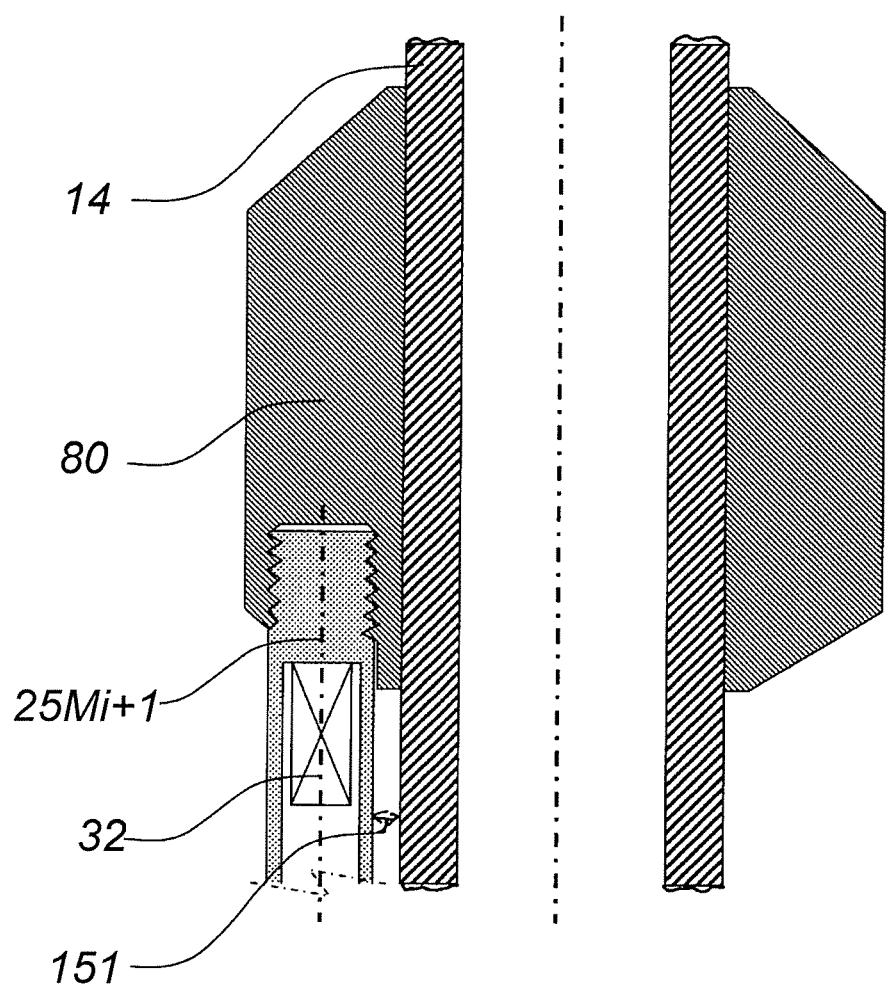
FIG. 13 is a diagrammatic view of one of the clamp assemblies connected to the tubing showing an acoustic modem spaced a distance away from the tubing.

Referring now to FIG. 3, shown therein is an apparatus 69. The apparatus 69 includes clamp assemblies 28a and 28b and the downhole tool 20, which can be and will be described as the acoustic modem 25Mi+1 by way of example. The apparatus 69 optionally includes a section of the tubing 14 and a downhole supporting the acoustic modem 25Mi+1. The acoustic modem 25 Mi+1 is connected to the tubing 14 utilizing the clamp assemblies 28a and 28b, as discussed above. In particular, the acoustic modem 25Mi+1 can be spaced a distance away from the tubing 14 and is provided with a first end 70, and a second end 72. The first end 70 of the acoustic modem 25Mi+1 is connected to the clamp assembly 28a, and the second end 72 of the acoustic modem 25Mi+1 is connected to the clamp assembly 28b. It should be noted that the section of the tubing 14 includes a first connection 74, and a second connection 76. The acoustic modem 25Mi+1 as well as the clamp assemblies 28a and 28b are positioned on the tubing 14 preferably such that the clamp assemblies 28a and 28b are spaced a distance away from and preferably not in contact with the first connection 74 and the second connection 76 to form a gap 151. (See FIG. 13.) In this example and as shown in FIG. 13, the acoustic modem 25Mi+1 preferably does not directly contact the tubing 14 and there is not a shear connection directly between the acoustic modem 25Mi+1 and the tubing 14. As will be discussed below, the apparatus 69 may include a shear connection between the clamp assemblies 28a and 28b and the tubing 14.

Figure 4A:
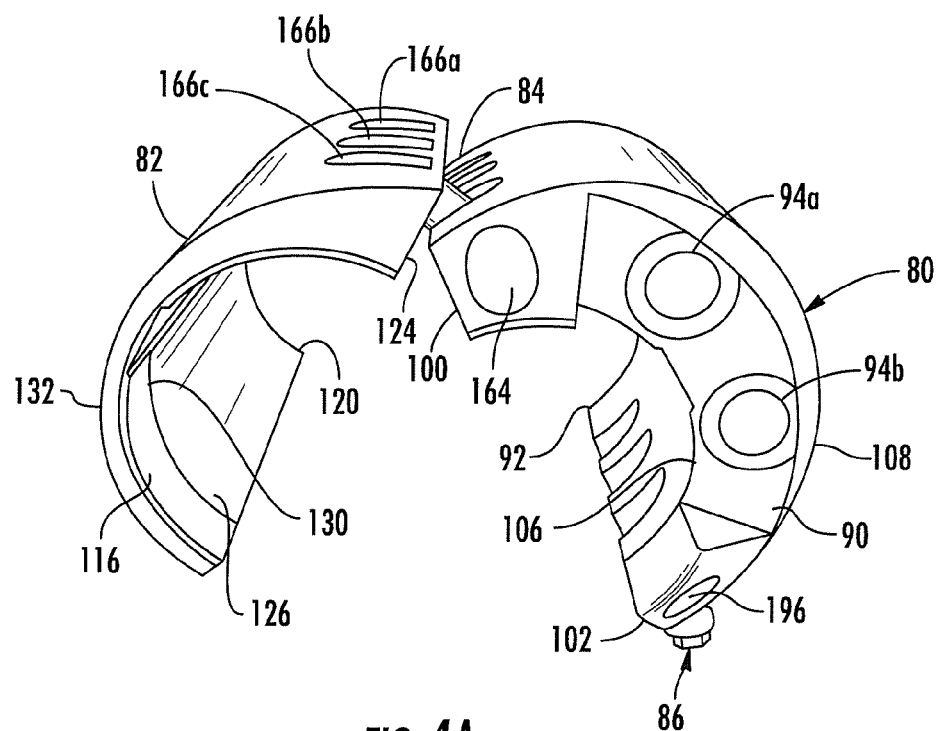
FIG. 4A is a perspective view of one of the clamp assemblies depicted in FIG. 3.
Figure 5:
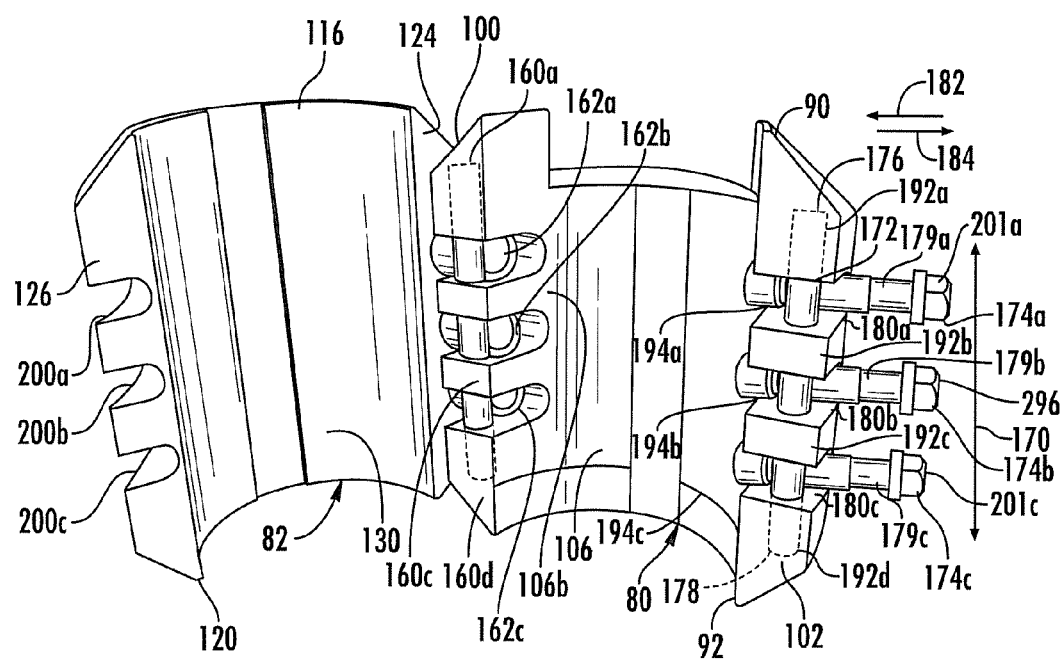
FIG. 5 is another perspective view of the clamp assembly depicted in FIG. 4A showing inner clamp surfaces defined by clamp parts of the clamp assembly.
Figure 6:
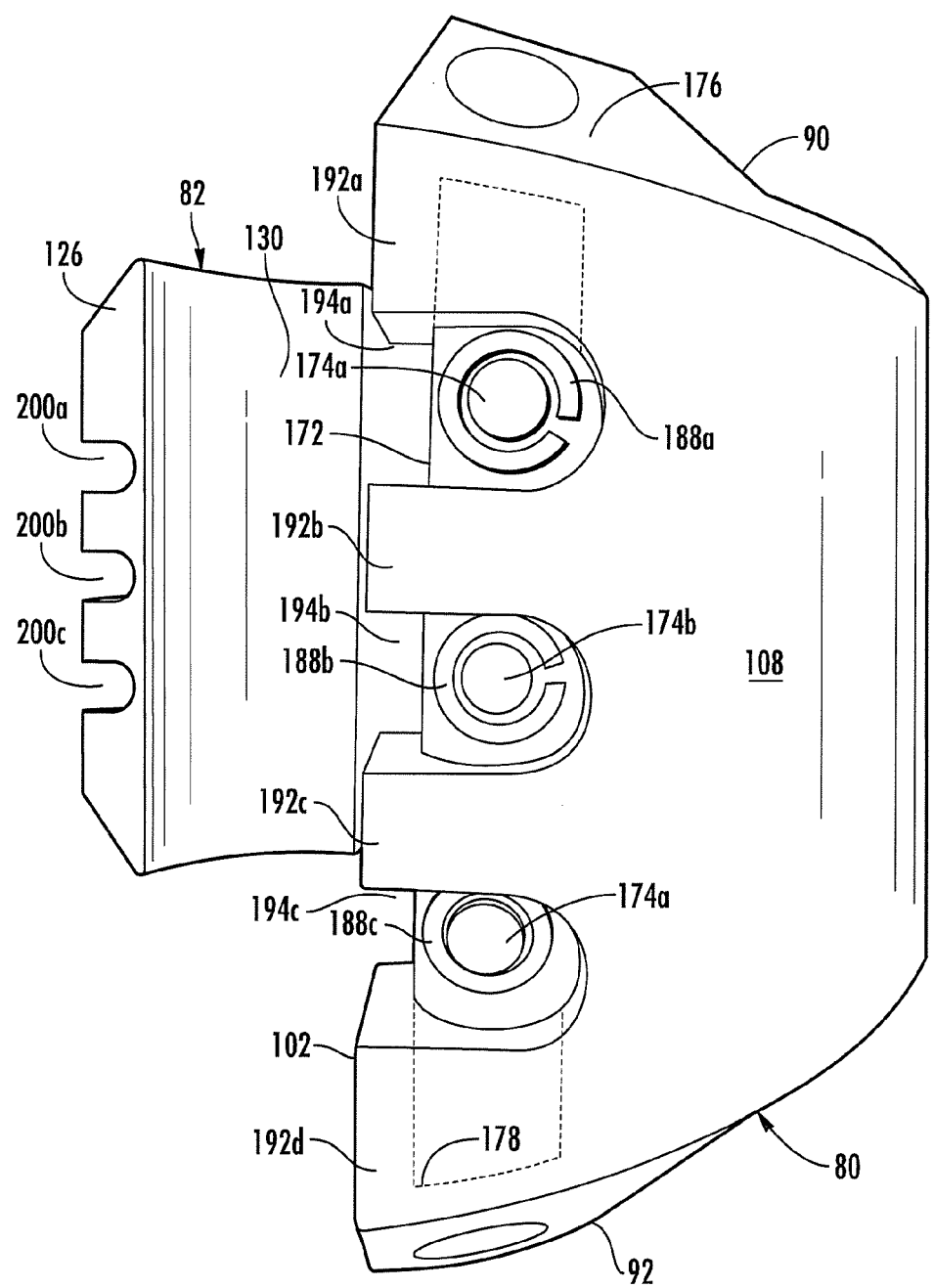
FIG. 6 is an elevational view showing an exemplary fastener of the clamp assembly depicted in FIGS. 4A and 5.

Referring now to FIGS. 4A, 5 and 6, shown therein is an exemplary clamp assembly 28, which can be either one of the clamp assemblies 28a and 28b. The clamp assembly 28 serves to connect one or more downhole tool 20 to the tubing 14, which is disposed in the well 10. The clamp assembly 28 is provided with a first clamp part 80, and a second clamp part 82. The first clamp part 80, and the second clamp part 82 are connected together to form a one-piece unit with a hinge assembly 84 and a fastener 86. The clamp assembly 28 is attached to the tubing 14 by spreading the first clamp part 80 and second clamp part 82 with the hinge assembly 84 and then connecting the opposite ends together with the fastener 86 once the clamp assembly 28 is positioned on the tubing 14.

The first clamp part 80 has a first end 90, and a second end 92. The first end 90 of the first clamp part 80 has at least one connection 94 capable of receiving and securing the at least one downhole tool 20. As shown in FIG. 4A, the first clamp part 80 can be provided with two connections 94a and 94b each of which is capable of securing the downhole tool 20, such as a threaded hole or a shoulder. The connections 94a and 94b is a device that mechanically joins two or more objects together and may include a threaded hole or an unthreaded hole with a recess so that the downhole tool 20 can be secured by a nut.

Either one of the connection 94a and the connection 94b rigidly connect the acoustic modem 25Mi+1 to the clamp assemblies 28a and 28b. The clamp assemblies 28a and 28b rigidly connect to the tubing 14. In this manner, the transceiver assembly 32 located in the acoustic modem 25Mi+1 close to the connection and exerting a vertical force parallel to a tubing axis, is also exerting the same vertical force on the clamp assemblies 28a and 28b and on the tubing 14, allowing for extensional wave propagation. In a reciprocal manner for the reception mode, the vertical displacement of the tubing 14 associated with the incoming extensional wave is transmitted to the clamp assemblies 28a and 28b and to the acoustic modem 25Mi+1 preferably without distortion, allowing for a receiving sensor (such as an accelerometer) located within the acoustic modem 25Mi+1 to detect this displacement. For the force to be transmitted through the clamp assemblies 28a and 28b to the tubing 14 preferably without distortion, or for the displacement to be transmitted from the tubing 14 to the acoustic modem 25Mi+1 preferably without distortion, the clamp assemblies 28a and 28b move like a rigid body and are free of resonances in the frequency range of operations.

The first clamp part 80 is also provided with a first side 100 and a second side 102. As will be discussed in more detail below, the first side 100 is connected to the hinge assembly 84 while the second side 102 is connected to the fastener 86. The first clamp part 80 is also provided with a first inner clamp surface 106 extending between the first side 100 and the second side 102; and a first external surface 108 also extending between the first side 100 and the second side 102.

The second clamp part 82 has a third end 116, and a fourth end 120. The second clamp part 82 is also provided with a third side 124, and a fourth side 126. The third side 124 and the fourth side 126 extend between the third end 116 and the fourth end 120. The second clamp part 82 also has a second inner clamp surface 130 extending between the third side 124 and the fourth side 126; and a second external surface 132 also extending between the third side 124 and the fourth side 126 generally opposite that of the second inner clamp surface 130.

As shown in FIG. 4A, for example, the first inner clamp surface 106 and the second inner clamp surface 130 are dimensioned and shaped so as to grip the exterior surface of the tubing 14. In one embodiment, the first inner clamp surface 106 and the second inner clamp surface 130 can be semi-cylindrically shaped. The first clamp part 80 and second clamp part 82 are sized and dimensioned so as to fit within the borehole, and in particular, the first external surface 108 and the second external surface 132 cooperate to form a substantially cylindrical shape.

Figures 7, 8:
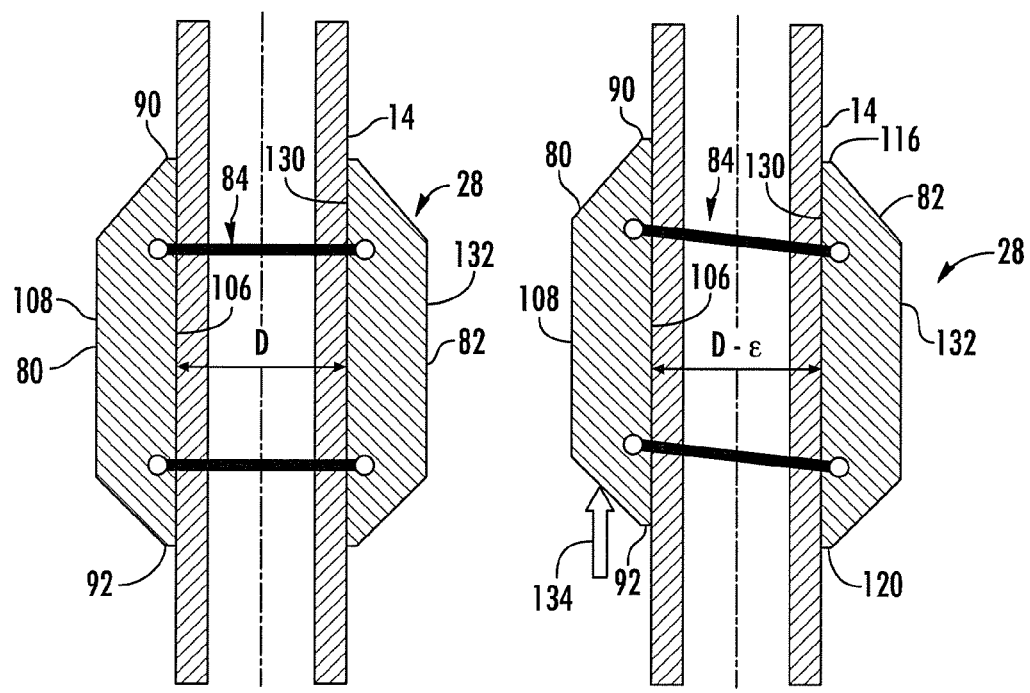
FIG. 7 is a diagrammatic view illustrating one of the clamp assemblies installed on the tubing prior to axial stress being applied to the clamp assembly.
FIG. 8 is another diagrammatic view of the clamp assembly depicted in FIG. 7 showing a self-tightening feature of the clamp assembly when axial stress is applied to one clamp part of the clamp assembly.

As shown in FIGS. 7 and 8, the first clamp part 80 and the second clamp part 82 are linked together by the hinge assembly 84 and the fastener 86 to form a self-tightening action. In a preferred embodiment, the hinge assembly 84 and the fastener 86 link the first clamp part 80 and the second clamp part 82 together to permit movement of one of the first clamp part 80 relative to the second clamp part 82 like a parallelogram to generate the self tightening action when one of the first clamp part 80 and the second clamp part 82 is submitted to an axial load 134. For example, in use the clamp assembly 28 can be dragged inside of a cylindrical hole (e.g., an open hole, casing, liner, or the like) so that only one of the first clamp part 80 and the second clamp part 82 is submitted to the axial load 134 caused by, for example, friction or shocks. The opposite one of the first clamp part 80 and the second clamp part 82 is not in contact with the cylindrical hole and this causes an unequal axial load 134 on the clamp assembly 28. If a dragging force or shock exceeds an adherence limit of the clamp assembly 28, the first clamp part 80, or the second clamp part 82 submitted to the axial load 134 tends to slip along the tubing 14, while the opposite one of the first clamp part 80, and the second clamp part 82 stays in place, due to the design of the clamp assembly 28. The clamp assembly 28 deforms like a parallelogram so that a distance between the first clamp part 80 and the second clamp part 82 is reduced. Consequently, the first clamp part 80 and the second clamp part 82 grip the tubing 14 even tighter when the first clamp part 80 and the second clamp part 82 are subjected to unequal axial forces.

Figure 4B:
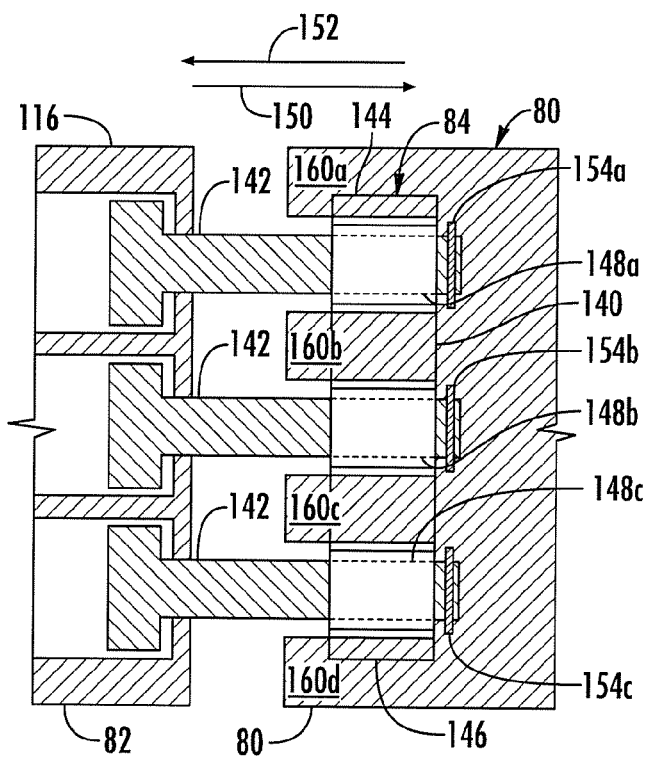
FIG. 4B is a side elevational view of an exemplary hinge assembly.

Shown in FIG. 4B, one example of the hinge assembly 84 is depicted. In general, the hinge assembly 84 is provided with a pin 140, and a plurality of bolts 142 such as threaded bolts which are connected to the pin 140 and movable relative thereto as discussed below. The pin 140 is provided with a first end 144 and a second end 146 and a plurality of a threaded openings 148a-c. The pin 140 is preferably cylindrically shaped and constructed of a rigid material such as steel. The bolts 142 are positioned within the threaded openings 148a-c and are movable in a first direction 150 generally towards the pin 140, and in a second direction 152 generally away from the pin 140. The hinge assembly 84 can also be provided with a plurality of stop members 154a-c connected to the bolts 142, such as a split ring so as to prevent removal of the bolts 142 from the pin 140.

The hinge assembly 84 is connected to the first side 100 of the first clamp part 80. As best shown in FIG. 5, the first side 100 can be configured with a plurality of spaced apart fingers 160a-d defining spaces 162a-c therebetween. A bore 164 is formed within the first clamp part 80 adjacent to the first side 100 such that the bore 164 extends through the fingers 160a-d. The pin 140 is positioned within the bore 164 such that the openings 148a-c are aligned with the spaces 162a-c.

A plurality of counter bores 166a-c are formed within the second clamp part 82 through the second external surface 132 and extend through the third side 124. The counter bores 166a-c are sized so as to receive and to capture the bolts 142 so as to prevent removal therefrom except through the counter bores 166a-c. To connect the first clamp part 80 to the second clamp part 82, the bolts 142 are positioned through the counter bores 166a-c and positioned within the openings 148a-c. The bolts 142 are provided with a loose fit within the counter bores 166a-c, and between the fingers 160a-d so that the pin 140 can move in an axial direction 170 to form the self-tightening action discussed above. The pin 140 can preferably move between 1/32 of an inch to 1/4 of an inch, more preferably between 1/16 of an inch and 3/16 of an inch, and even more preferably about 1/8 of an inch.

An exemplary embodiment of the fastener 86 is shown in FIGS. 5 and 6. The fastener 86 can be constructed similarly as the hinge assembly 84, and in general is provided with one or more devices to removably and preferably non-hingedly connect the second side 102 of the first clamp part 80 to the fourth side 126 of the second clamp part 82 while permitting movement within the axial direction 170 when the second side 102 is connected to the fourth side 126. For example, the fastener 86 can be provided with a pin 172, and a plurality of bolts 174 such as threaded bolts which are connected to the pin 172 and movable relative thereto as discussed below. The pin 172 is provided with a first end 176 and a second end 178 and a plurality of a threaded openings 180a-c. The pin 172 is preferably cylindrically shaped and constructed of a rigid material such as steel. The bolts 174a-c have a shaft 179a-c positioned within the threaded openings 180a-c and are movable in a first direction 182 generally towards the pin 172, and in a second direction 184 generally away from the pin 172. The fastener 86 can also be provided with a plurality of stop members 188a-c (see FIG. 6) connected to the bolts 174, such as a split ring so as to prevent removal of the bolts 174 from the pin 172.

The fastener 86 can be connected to the second side 102 of the first clamp part 80 although the fastener 86 could be connected to the fourth side 126. As best shown in FIG. 5, the second side 102 can be configured with a plurality of spaced apart fingers 192a-d defining spaces 194a-c therebetween. As shown in FIG. 4A, a bore 196 is formed within the first clamp part 80 adjacent to the second side 102 such that the bore 196 extends through the fingers 192a-d. The pin 172 is positioned within the bore 196 such that the openings 180a-c are aligned with the spaces 194a-c.

A plurality of notches 200a-c are formed within the second clamp part 82 through the second external surface 132 and extend into the fourth side 126. The notches 200a-c are sized so as to receive the bolts 174 and aligned with the spaces 194a-c to permit the shafts 179a-c of the bolts 174 to be inserted within the notches 200a-c when the clamp assembly 28 is being installed onto the tubing 14. The bolts 174a-c have heads 201a-c to engage the second clamp part 82 when the bolts 174 are tightened to move the fourth side 126 closer to the second side 102. The bolts 174 are provided with a loose fit within the notches 200a-c, and between the fingers 192a-d so that the pin 172 can move in the axial direction 170 within the bore 196 to form the self-tightening action discussed above. The pin 172 can preferably move between 1/32 of an inch to 1/4 of an inch, and more preferably between 1/16 of an inch and 3/16 of an inch, and even more preferably about 1/8 of an inch. The term "about" as used herein refers to manufacturing tolerances and means within 10% of a predetermined value.

Figure 9:
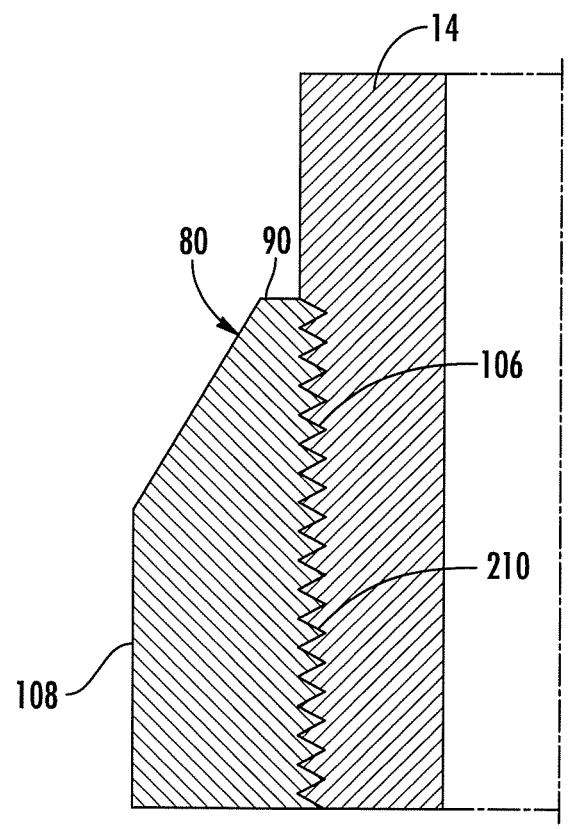
FIG. 9 is a cross-sectional diagram of a version of the clamp assembly mounted to the tubing showing teeth of an inner clamp surface of the clamp assembly gripping the tubing.

Shown in FIG. 9 is a cross-sectional diagram of a version of the clamp assembly 28 mounted to the tubing 14. To increase the grip of the clamp assembly 28 on the tubing 14, the first inner clamp surface 106 and/or the second inner clamp surface 130 can be roughed, or abraded rather than being a smooth surface. For example, as shown in FIG. 9, the first inner clamp surface 106 includes a plurality of teeth 210, only one of which is labeled for purposes of clarity. The teeth 210 are preferably symmetric to resist movement in both axial directions. Preferably, the first clamp part 80 and the second clamp part 82 are constructed of a material that is harder than the tubing 14 so that the teeth 210 will bite into the tubing 14 when the clamp assembly 28 is installed to form a shear coupling between the clamp assembly 28 and the tubing 14. Alternatively, the teeth 210 can be hardened by applying a surface finish such as a nitriding or carburizing treatment. The teeth 210 can be formed with a variety of sizes and depths. The depth of the teeth 210 is preferably greater than surface imperfections of the tubing 14, such as rust. The size of the teeth 210 can be varied, and an exemplary size is 20 teeth/inch. The teeth 210 can be formed using any suitable method, such as cutting a triangular thread on the first and second inner clamp surfaces 106 and 130.

Figure 10:
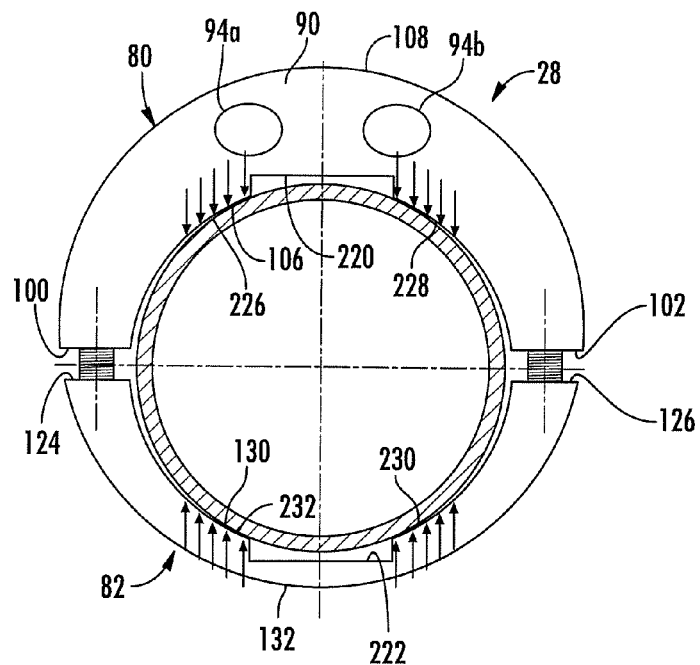
FIG. 10 is a top plan view of another version of the clamp assembly mounted onto a section of the tubing (shown in cross-section) illustrating slots formed in the inner clamp surfaces of the clamp parts depicted in FIG. 5 defining at least two contact locations between each clamp part and the tubing.

FIG. 10 is a top plan view of the clamp assembly 28 mounted onto a section of the tubing 14 (shown in cross-section) illustrating a first slot 220 and a second slot 222. The first slot 220 is formed in the first inner clamp surface 106 and extends between the first end 90 and the second end 92. The second slot 222 is formed in the second inner clamp surface 130 and extends between the third end 116 and the fourth end 120. As discussed above, the tolerance on a diameter of the tubing 14 is rather large. To accommodate the tolerance, the internal diameter of the first and second inner clamp surfaces 106 and 130 should be equal to or greater than the largest pipe diameter. The first and second slots 220 and 222 serve to divide the first and second inner clamp surfaces 106 and 130 into clamp zones 226, 228, 230 and 232, which spreads the clamping force over a larger area thereby increasing the stability of the clamp assembly 28 on the tubing 14, as well as reducing deformation of the tubing 14 due to the clamp force. The size of the first and second slots 220 and 222 can be larger or smaller than that shown in FIG. 10, and the location of the first and second slots 220 and 222 can be changed. The first slot 220 is desirably positioned between the connections 94a and 94b to position the clamp zones 226 and 228 in close proximity to the connections 94a and 94b. The term close proximity, as used herein, refers to a distance less than ½ inch, and more preferably about ⅜ inch.

Figure 11:
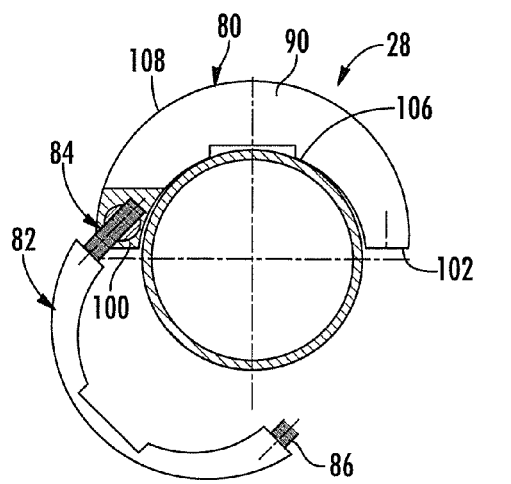
FIG. 11 is a fragmental, top plan view of the clamp assembly being installed on the tubing showing a hinge assembly constructed in accordance with the present disclosure.
Figure 12:
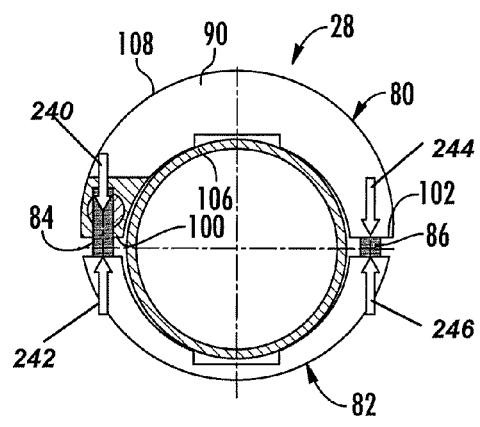
FIG. 12 is another fragmental, top plan view of the clamp assembly depicted in FIG. 11 in which the clamp assembly is installed on the tubing with arrows showing force being exerted on the clamp parts by adjustment of the hinge assembly and the fastener.

FIG. 11 is a fragmental, top plan view of the clamp assembly 28 being installed on the tubing 14 showing the hinge assembly 84 constructed in accordance with the present disclosure. In particular, the bolts 142 and 174 are loosened and then the bolts 174 of the fastener 86 are removed from the notches 200 so that the clamp assembly 28 can be opened as shown in FIG. 11. Then, the clamp assembly 28 is placed on the tubing 14 as shown in FIG. 11, and the bolts 174 are positioned within the notches 200 as shown in FIG. 12. The bolts 142 and 174 can then be tightened, which applies force to the first clamp part 80 and the second clamp part 82 as shown by the arrows 240, 242, 244 and 246 in FIG. 12.

Junction Box

Referring now to FIG. 14, shown therein is a junction box 300 constructed in accordance with the present disclosure. The junction box 300 provides a way to mechanically secure two or more electric/electronic devices together, i.e., downhole tools, while an electric connection between the devices may be automatically obtained in a reliable atmospheric chamber. The junction box 300 can be secured onto a section of the tubing 14 with a clamp, or the junction box 300 can be cut into a main or carrier tool, for example as an integral component, installed somewhere in the downhole string.

The downhole tools can be either an electronic tool (for example pressure gauge) or a power supply (for example a battery pack). As will be discussed in more detail below, a read-out port can be provided to easily connect a computer to one or more downhole tools to program the downhole tools and/or read data from the downhole tools.

As shown in FIG. 14, the junction box 300 is provided with a body member 301 defining a first port 302 and a second port 304. The first port 302 is adapted to receive a first portion of a first downhole tool 306, and the second port 304 is adapted to receive a second portion of a second downhole tool 308. The body member 301 has one or more external surfaces 312.

The first port 302 has a first end 314, a second end 316, and a first length 318 extending between the first end 314 and the second end 316. Likewise, the second port 304 has a first end 320, a second end 322 and a second length 324 extending between the first end 314 and the second end 316. The first ends 314 and 320 intersect the one or more external surfaces 312 while the second ends 316 and 322 are positioned within the body member 301. The first length 318 and the second length may be less than the length of the first downhole tool 306 and the second downhole tool 308 such that the first downhole tool 306 and the second downhole tool 308 project from one or more of the external surfaces 312 of the body member 301 as shown in FIG. 15.

The body member 301 is also provided with an electric chamber 330 which intersects the first port 302 and the second port 304 within the body member 301. Preferably, the electric chamber 330 intersects the first port 302 and the second port 304 near the second ends 316 and 322 thereof as will be described below. The first port 302, the second port 304 and the electric chamber 330 can be formed in the body member 301 using any suitable technology such as cutting technology, drilling technology, molding technology, and/or the like.

The junction box 300 is also provided with a first mechanical connection 340, a second mechanical connection 342, a first electric connector 344, a second electric connector 346, and electrical wiring 348. The electrical wiring 348 electrically connects the first electric connector 344 to the second electric connector 346 to form a communication path between the first downhole tool 306 and the second downhole tool 308. The electrical wiring 348 can be implemented in any suitable form such as one or more copper wires, aluminum wires, or the like.

The first mechanical connection 340 is positioned on the first port 302 and serves to secure the first downhole tool 306 to the body member 301. The second mechanical connection 342 is positioned on the second port 304 and serves to secure the second downhole tool 308 to the body member 301. As shown in FIG. 15, the first and second downhole tools 306 and 308 can extend from the body member 301 in a parallel orientation. The first and second mechanical connections 340 and 342 may include a seal bore for seals and a threaded connection as shown in FIG. 14. Alternatively, the first and second mechanical connections 340 and 342 may include a J-slot to provide a quick and easy way to connect the first and second downhole tools 306 and 308. Other mechanical means can also be preferred, depending of the geometry of the first and second downhole tools 306 and 308. For example, the first and second downhole tools 306 and 308 can include a flange that can be secured on the body member 301 with several screws or bolts. Any type of seals can be selected, according to the requirements. The seal can be elastomeric, plastic or metallic, or a combination of all.

The first electric connector 344 and the second electric connector 346 are secured into the first port 302 and the second port 304 utilizing any suitable technology such as a pressfit connector or the like. The first and second downhole tools 306 and 308 to be secured on the body member 301 may be equipped at their extremity with third and fourth electric connectors 360 and 362 that can automatically mate with the first electric connector 344 and the second electric connector 346. When an electrical connection between the first and second downhole tools 306 and 308 and the first electric connector 344 and the second electric connector 346 requires more than one contact, then the first, second, third, and fourth electric connectors 344, 346, 360 and 362 are preferably constructed with concentric contacts to make installation easier. For example, two contacts can be achieved with a coaxial connector or three contacts with a triaxial connector. The first electric connector 344 and the second electric connector 346 can be connected to the electrical wiring 348 by solder, crimping, or any other suitable means of electrical connection. The electrical wiring 348 may have a length sufficient for splicing outside the junction box 300.

Other types of connectors can also be used in the body member 301 and the body member 301 can optionally be equipped with a slot provided or cut in the body member 301 to receive an orientation key of the first and second downhole tools 306 and 308. It should be noted that a threaded connection can still be used as the first and second mechanical connections 340 and 342 by equipping the first and second downhole tools 306 and 308 with a floating nut that can rotate while the first and second downhole tools 306 and 308 engage the body member 301 without rotation.

The body member 301 optionally defines a readout port 370 having a first end 373 intersecting the one or more external surfaces 312 and a second end 374 intersecting the electric chamber 330. The junction box 300 may also be provided with a fifth electric connector 375 positioned within the readout port 370 and connected to the electrical wiring 348 via any suitable connection, such as solder or crimping. The readout port 370 may be normally closed and sealed by a first plug 376a. When the first plug 376a is removed, a computer cable with a connector, for example, can be installed in the readout port 370. This provides a convenient way to communicate with the first and second downhole tools 306 and 308 from a computer or other device, to initialize, to tune or to retrieve data from the first and second downhole tools 306 and 308.

In the example depicted in FIG. 14, the readout port 370 is located between the first port 302 and the second port 304. However, the readout port 370 can be located in any convenient location. For example, the readout port 370 can also be located laterally (at the extremity of the electric chamber 330. The first plug 376a may include at least a seal and a thread. The junction box 300 can also be provided with a second plug 376b to seal the electric chamber 330 with at least a seal and a thread in a similar manner as the first plug 376a. In one embodiment, the readout port 370 can be formed in the body member 301 generally perpendicular to the one or more external surfaces 312 intersected by the readout port 370. Alternatively, to make it easier to connect a computer or other device to the readout port 370, the readout port 370 can be angled relative to perpendicular with respect to the one or more external surfaces 312. For example, the readout port 370 can be angled by about 10° from perpendicular. Once the first plug 376a, second plug 376b, first downhole tool 306 and the second downhole tool 308 are installed, the body member 301 preferably forms an atmospheric chamber in which the electrical wiring 348 resides.

The body member 301 is preferably constructed as a solid block which has been milled to include the first port 302, the second port 304, the electric chamber 330, and the readout port 370. However, it should be understood that the body member 301 can be constructed in a variety of different manners. Further, it should be understood that the body member 301 is preferably constructed of a material which is suitable for downhole use, such as stainless steel. The body member 301 can be implemented in a variety of forms and can either be integral with a carrier tool 377 to form a unitary structure, or separate from the carrier tool 377 and connected thereto. A variety of examples will be discussed below to illustrate the various manners in which the junction box 300 can be implemented by varying the construction of the body member 301. In the description below, similar elements of the junction box 300 will be described using a same numerical prefix as used above. Further, reference numerals may not be included on similar elements in the additional embodiments shown and described below for the purposes of clarity and brevity.

Referring now to FIG. 15, shown therein is an apparatus 371 which is provided with a junction box 300a, which is identical in construction and function as the junction box 300 described above with the exception that the junction box 300a is not provided with the readout port 370. The apparatus 371 also includes the first downhole tool 306 and the second downhole tool 308 connected to the junction box 300a and extending therefrom as shown.

Figure 16:
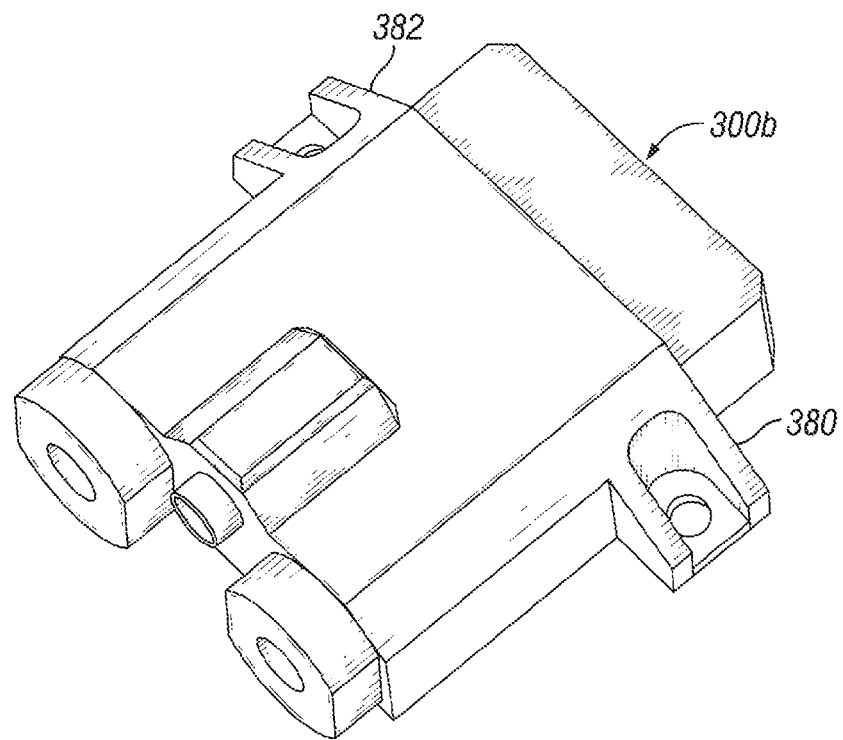
FIG. 16 is a perspective view of another embodiment of a junction box constructed in accordance with the present disclosure.
Figure 17:
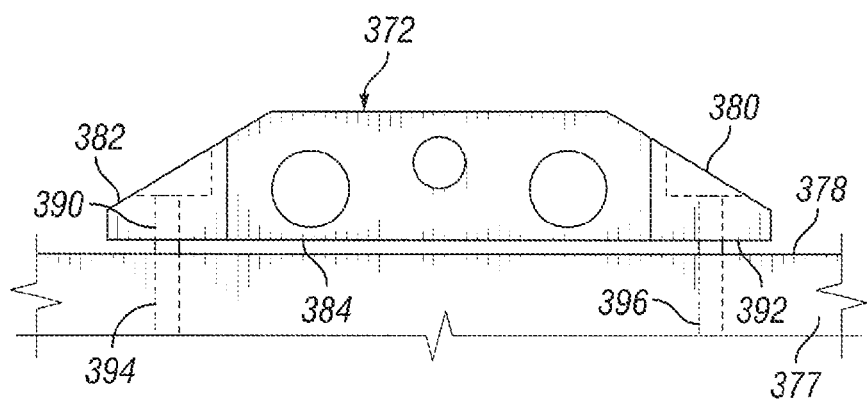
FIG. 17 is a side view of the junction box depicted in FIG. 16 connected to a carrier tool in accordance with the present disclosure.

Referring now to FIGS. 16 and 17, shown therein is an apparatus 372 including a junction box 300b connected to the carrier tool 377. The carrier tool 377 can be a clamp or a drill stem test gauge adapter (which is known in the art as a DST gauge adapter, and/or a gauge carrier) having a first mounting surface 378. The junction box 300b is identical in construction and function as the junction box 300 described above, with the exception that the junction box 300b is provided with a body member 301b having a first tab 380, a second tab 382, and a second mounting surface 384 positioned between the first tab 380 and the second tab 382. As shown in FIG. 17, the first and second mounting surface 378 and 384 can be generally planar, however, it should be understood that the first and second mounting surfaces 378 and 384 can be provided with other shapes, such as a corrugated shape which would impart more structural integrity in a connection formed between the junction box 300b and the carrier tool 377.

In this embodiment, the junction box 300b is not contained within the carrier tool 377. The body member 301b may be mounted to the carrier tool 377 via bolts (not shown) which extend through holes 390, 392, 394 and 396 located within the first and second tabs 380 and 382, and the carrier tool 377. As shown in FIG. 16, when mounted, the second mounting surface 384 of the body member 301b preferably engages the first mounting surface 378 of the carrier tool 377.

Figure 18:
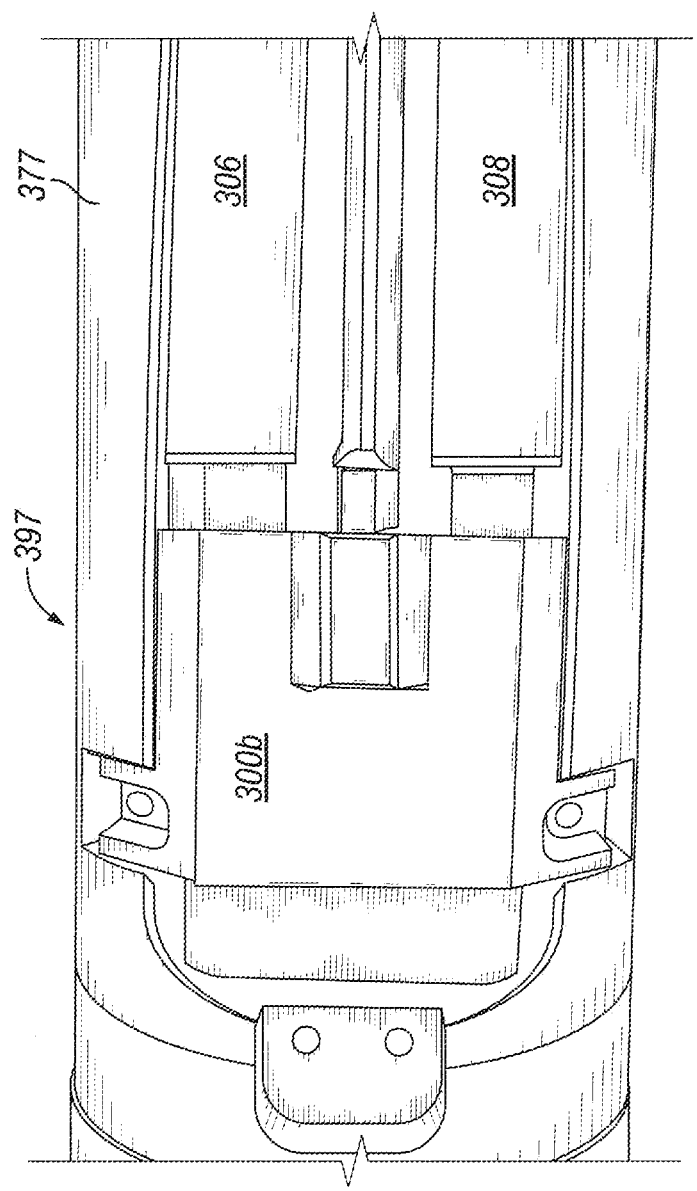
FIG. 18 is a top plan view of the junction box depicted in FIGS. 16 and 17 in which the carrier tool is a drill stem testing gauge assembly.

Referring to FIG. 18, shown therein is an apparatus 397 constructed in accordance with the present disclosure. The apparatus 397 is provided with the junction box 300b connected to the carrier tool 377. In the example depicted in FIG. 18, the carrier tool 377 is a drill stem test gauge adapter. In the example shown, the carrier tool 377 defines a cavity 398 which is sized to receive the junction box 300b, and the first and second downhole tools 306 and 308 which are connected to the junction box 300b. The construction and use of a drill stem test gauge adapter is known in the art and so no further discussion is believed to be necessary to teach one skilled in the art how to make and use the drill stem test gauge adapter.

Figure 19:
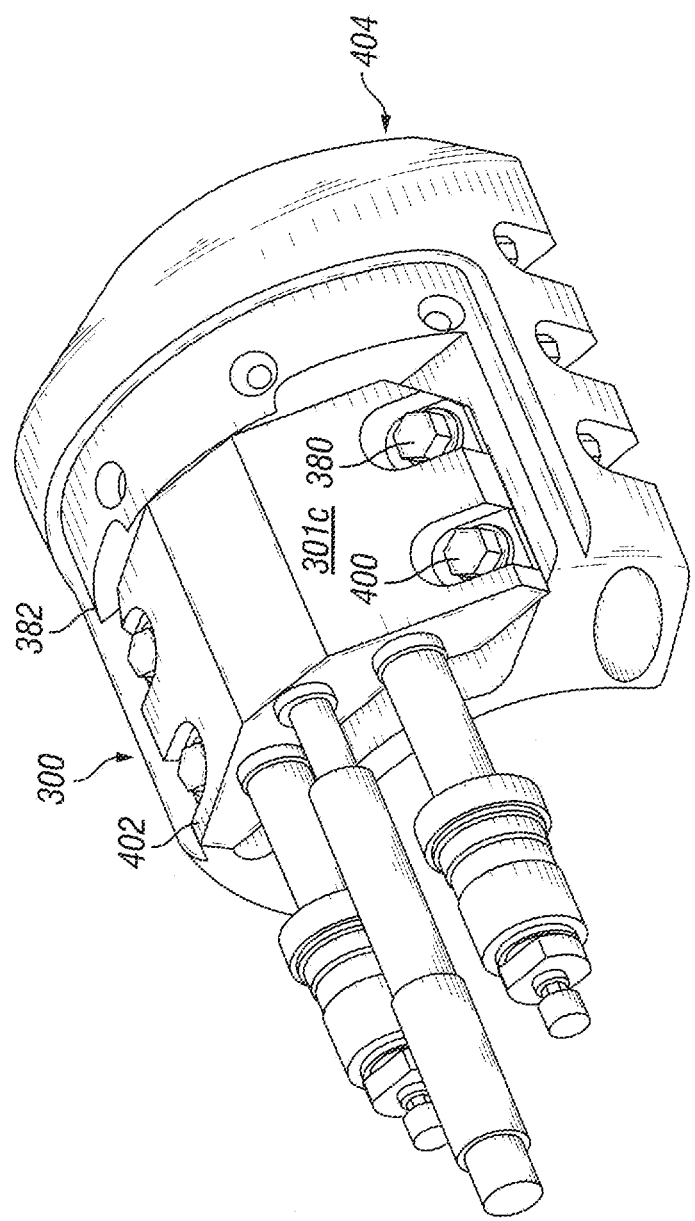
FIG. 19 is a perspective view of a clamp assembly constructed in accordance with the present disclosure having a junction box attached to a clamp part thereof.

Referring now to FIG. 19, shown therein is another example of a junction box 300c. In this example, the junction box 300c is identical in construction and function as the junction box 300b, with the exception that a body member 301c of the junction box 300c further includes a third tab 400, and a fourth tab 402. In the example shown in FIG. 18, the carrier tool 377 is implemented as a clamp part 403 of a clamp assembly 404 adapted to connect the junction box 300c to a section of the tubing 14 (not shown in FIG. 19). The clamp assembly 404 can be constructed similar to the clamp assembly 28, discussed above, with the exception that the clamp part 403 is provided with a lower-profile design to accommodate the junction box 300c. The junction box 300c can be connected to clamp part 403 via any suitable method. For example, the junction box 300c can be removably connected to the clamp part 403 using nuts, bolts and/or screws; or permanently connected to the clamp part 403 by welding.

Figure 20:
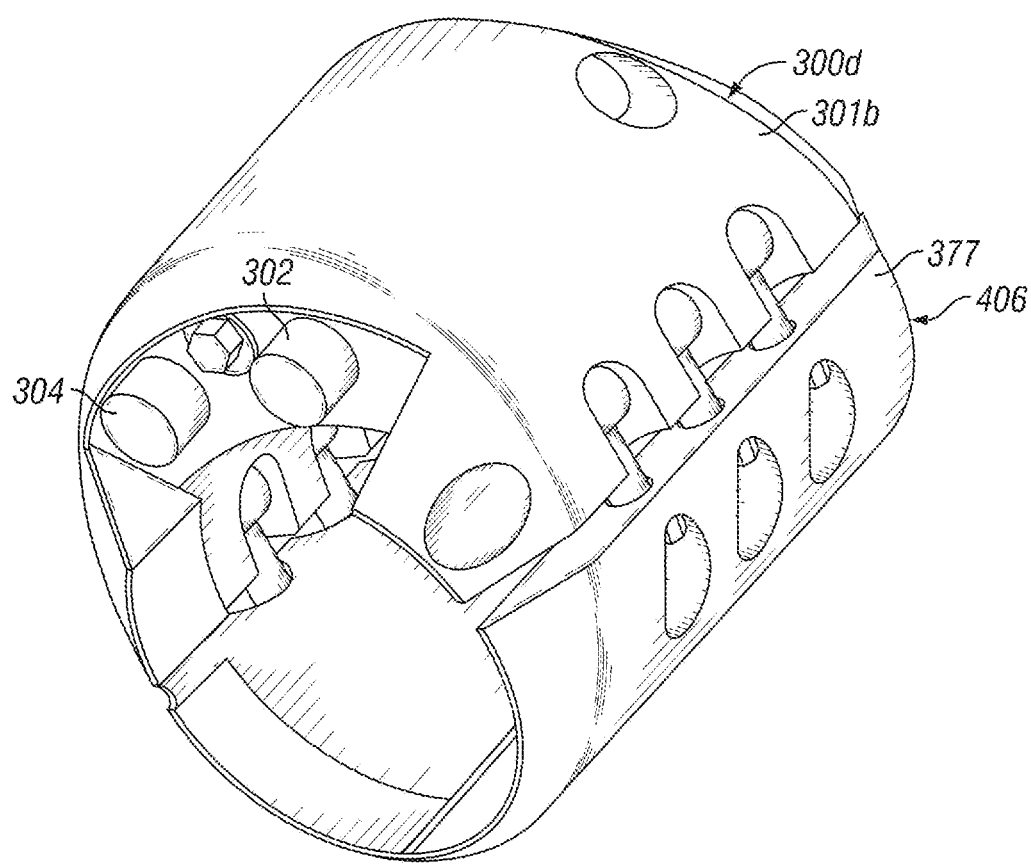
FIG. 20 is a perspective view of another embodiment of the clamp assembly constructed in accordance with the present disclosure having a clamp part forming a body member of a junction box.

Referring now to FIG. 20, shown therein is another example of a junction box 300d, which is similar in construction and function as the junction box 300c, with the exception that the junction box 300d has a body member 301b which is an integral part of the carrier tool 377. In this example, the carrier tool 377 is a clamp assembly 406 adapted to connect the junction box 300d to a section of the tubing 14. The clamp assembly 406 can be similar in construction and function as the clamp assembly 28, discussed above, with the exception of the addition of the first port 302; the second port 304; the electric chamber 330 intersecting the first port 302 and the second port 304; the first electric connector 344; the second electric connector 346; and the electrical wiring 348.

The carrier tool 377 can be implemented in a variety of manners. For example, the junction box 300 may be secured to an exterior surface of a section of tubing 14 and in this case, the tubing 14 would be the carrier tool 377. The junction box 300 may be secured to the tubing 14 by any suitable means. For example, but not by way of limitation, the junction box 300 may be secured to the exterior surface of the tubing 14 using bolts, screws or any other suitable means for removably securing the junction box 300 to the exterior surface of the tubing 14. Further, for example, but not by way of limitation, the junction box 300 may be secured to the exterior surface of the tubing 14 by welding or any other suitable means of permanently securing the junction box 300 to the exterior surface of the tubing 14. In one embodiment, the junction box 300 is secured to the exterior surface of the tubing 14 without any modification to the tubing 14. In another embodiment, the junction box 300 may be secured to the exterior surface of the tubing 14 in an area where the tubing 14 is adapted to receive the junction box 300, such as, but not by way of limitation, an area where the tubing 14 is thicker or specifically adapted to receive bolts, or any other suitable means. In another embodiment, the junction box 300 may be secured to the exterior surface of the tubing 14 in an area adapted to receive the junction box 300 within a recessed portion of the exterior surface of the tubing 14.

Figure 21:
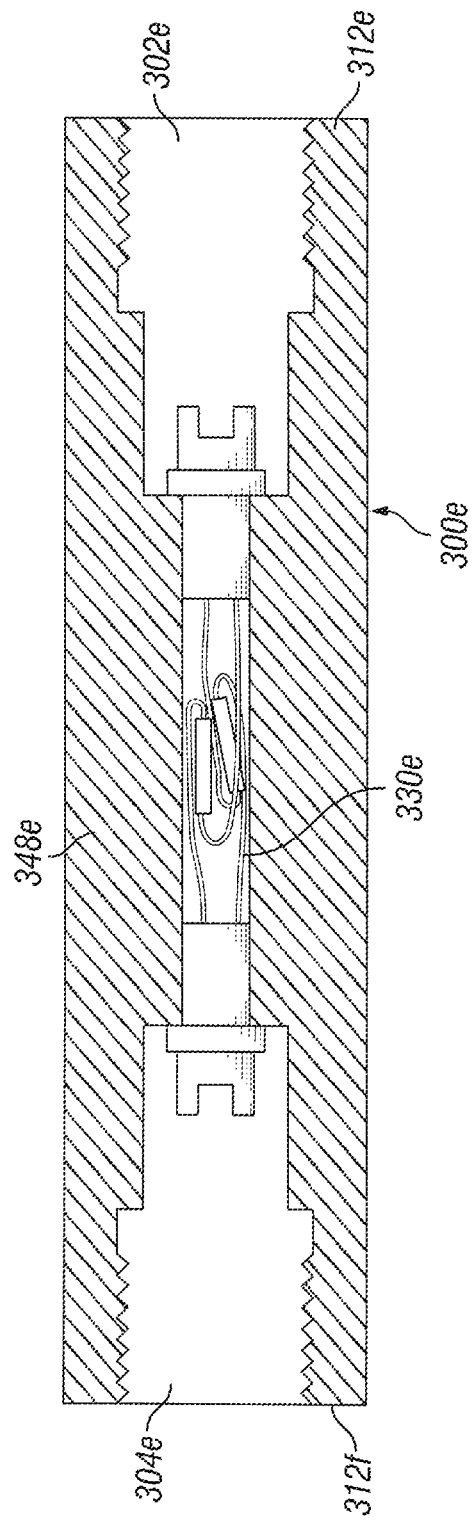
FIG. 21 is a cross-sectional view of yet another embodiment of a junction box constructed in accordance with the present disclosure.

Referring now to FIG. 21, shown therein is a cross sectional view of another junction box 300e which is identical in construction and function as the junction box 300 described above, with the exception that the junction box 300e has a first port 302e and a second port 304e that engage different external surfaces 312e and 312f. Further, the junction box 300e has an electrical chamber 330e that connects the first port 302e and the second port 304e but which may not intersect an external surfaces 312e or 312f of the body member 301e.

Thus, it can be seen that the junction boxes 300 and 300a-e can be used to establish communication between the first downhole tool 306 and the second downhole tool 308. For example, the first downhole tool 306 can be connected to the first port 302 of the junction box 300b, and the second downhole tool 308 can be connected to the second port 304 of the junction box 300b such that the first electric connector 344 in the first port 302 is connected to the third electric connector 360 of the first downhole tool 306, and the second electric connector 346 in the second port 304 is connected to the fourth electric connector 362 of the second downhole tool 308. Thereafter, the junction box 300b can be connected to the carrier tool 377, which is sized and adapted to be positioned within the well 10.

In another version, the present disclosure describes a method of connecting first and second downhole tools 306 and 308 (at least two) to the tubing 14 for insertion within the well 10. In this version, two clamp assemblies selected from the group of clamp assemblies 28, 404, and 406 are possessed. In this version at least one of the clamp assemblies either the clamp assemblies 404, or 406 for electrically connecting the first and second downhole tools 306 and 308 together. Utilizing the clamp assembly 28 is optional. The clamp assemblies 404 and/or 406 have first and second ports 302 and 304 for receiving and securing the first and second downhole tools 306 and 308. A first one of the at least two clamp assemblies 404 and/or 406 has (1) the electric chamber 330 intersecting the first and second ports 302 and 304, (2) first and second electric connectors 344 and 346 within the first and second ports 302 and 304, and (3) electrical wiring 348 extending through the electric chamber 330 and connecting the first and second electric connectors 344 and 346 together. The first and second downhole tools 306 and 308 are connected to the connections/ports of the at least two clamp assemblies 28, 404 and 406 with the first and second electric connectors 344 and 346 and the electrical wiring 348 of the first one of the at least two clamp assemblies 404 and 406 establishing electrical communication between the first and second downhole tools 306 and 308. Then, the clamp assemblies 28, 404 and/or 406 can be connected to an exterior surface of the tubing 14.

Although only a few embodiments of the present invention have been described in detail above, those of ordinary skill in the art will readily appreciate that many modifications are possible without materially departing from the teachings of the present invention. Accordingly, such modifications are intended to be included within the scope of the present invention as defined in the claims.

What is claimed is:

1. A junction box for connecting at least two downhole tools to a section of tubing, the junction box comprising:
   a body member defining a first port and a second port, the first port adapted to receive a first portion of a first downhole tool, and the second port adapted to receive a second portion of a second downhole tool, the body member having one or more external surfaces, the first port and the second port having a first end intersecting the one or more external surfaces, a second end positioned within and extending into the body member, and first and second lengths extending between the first end and the second end, the first and second lengths being less than lengths of the first downhole tool and the second downhole tool, the body member defining an electric chamber intersecting the first port and the second port within the body member;

a first mechanical connection on the first port for securing the first downhole tool;

a second mechanical connection on the second port for securing the second downhole tool;

a first electric connector installed on the second end of the first port;

a second electric connector installed on the second end of the second port, wherein the first and second electric connector extends into the second end of the first and second port; and electric wiring positioned within the electric chamber and connected to the first electric connector and the second electric connector to couple the first electric connector and the second electric connector.

2. The junction box of claim 1, wherein the body member is integral with a first clamp part of a clamp assembly.

3. The junction box of claim 1, wherein the body member is separate from a first clamp part of a clamp assembly and adapted to connect to the first clamp part.

4. The junction box of claim 1, further comprising a first plug, and wherein the body member further defines a read-out port having a first end intersecting the one or more external surfaces and a second end intersecting the electric chamber; a third electric connector installed on the second end of the read-out port, the third electric connector coupled to the electric wiring; and a third mechanical connection on the read-out port for securing the first plug.

5. The junction box of claim 1, wherein body member is configured for connection to a drill stem testing gauge assembly.

6. An apparatus, comprising:
a first downhole tool;
a second downhole tool;
a carrier tool; and
a junction box connected to the carrier tool, the junction box comprising:
a body member defining a first port and a second port, the first port receiving a first portion of the first downhole tool, and the second port receiving a second portion of a second downhole tool, the body member having one or more external surfaces, the first port and the second port having a first end intersecting the one or more external surfaces, a second end positioned within and extending into the body member, and first and second lengths extending between the first end and the second end, the first and second lengths being less than lengths of the first downhole tool and the second downhole tool, the body member defining an electric chamber intersecting the first port and the second port within the body member;

a first mechanical connection on the first port for securing the first downhole tool;

a second mechanical connection on the second port for securing the second downhole tool;

a first electric connector installed on the second end of the first port and communicating with the first downhole tool;

a second electric connector installed on the second end of the second port and communicating with the second downhole tool, wherein the first and second electric connector extends into the second end of the first and second port; and electric wiring positioned within the electric chamber and connected to the first electric connector and the second electric connector to couple the first electric connector and the second electric connector.

7. The apparatus of claim 6, wherein the body member is internal to the carrier tool.

8. The apparatus of claim 6, wherein the junction box is external to the carrier tool.

9. The apparatus of claim 6, wherein the junction box further comprising a first plug, and wherein the body member further defines a read-out port having a first end intersecting the one or more external surfaces and a second end intersecting the electric chamber; and wherein the junction box further comprises a third electric connector installed on the second end of the read-out port, the third electric connector coupled to the electric wiring; and a third mechanical connection on the read-out port for securing the first plug.

10. The apparatus of claim 6, wherein the carrier tool includes a drill stem testing gauge assembly.

11. A method of establishing communication between a first downhole tool and a second downhole tool, comprising the steps of:

connecting the first downhole tool to a first port of a junction box;

connecting the second downhole tool to a second port of the junction box, a body member defining the first port and the second port, the first port and the second port each having a first end and a second end, wherein the first end intersects one or more external surfaces of the body member and the second end is positioned within and extends into the body member, the junction box having a first electric connector in the first port, and a second electric connector in the second port, the first downhole tool having a third electric connector connected to the first electric connector in the first port, and the second downhole tool having a fourth electric connector connected to the second electric connector in the second port; and connecting the junction box to a carrier tool sized and adapted to be positioned within a well.

\* \* \* \* \*